(12) United States Patent
Watts (10) Patent No.: US 6,578,880 B2
(45) Date of Patent: Jun. 17, 2003

(54) WEDGETHREAD PIPE CONNECTION

(75) Inventor: John D. Watts, Austin, TX (US)

(73) Assignee: Ramos, Beverly Watts, Austin, TX (US)

(*) Notice: Subject to any disclaimer, the term of this patent is extended or adjusted under 35 U.S.C. 154(b) by 0 days.

(21) Appl. No.: 09/994,597

(22) Filed: Nov. 19, 2001

(65) Prior Publication Data

US 2002/0074799 A1 Jun. 20, 2002

Related U.S. Application Data (63) Continuation of application No. 09/573,480, filed on May 16, 2000, now abandoned, which is a continuation-in-part of application No. 09/421,483, filed on Oct. 20, 1999, now abandoned.

(51) Int. Cl.$^7$ .................................................. F16L 15/00
(52) U.S. Cl. ...................................... 285/334; 285/390
(58) Field of Search ................................ 285/333, 334, 285/94, 390, 355

(56) References Cited

U.S. PATENT DOCUMENTS

| | | | | |
|---|---|---|---|---|
| 4,692,988 A | * | 9/1987 | Shulver et al. ............... 29/458 |
| RE34,467 E | * | 12/1993 | Reeves ....................... 285/334 |
| 5,360,239 A | * | 11/1994 | Klementich .................. 285/94 |
| 5,360,240 A | * | 11/1994 | Mott .......................... 285/95 |
| 5,427,418 A | * | 6/1995 | Watts ......................... 285/94 |
| 5,431,831 A | * | 7/1995 | Vincent ...................... 508/116 |
| 5,649,725 A | * | 7/1997 | Nagasaku et al. ........... 285/334 |
| 6,050,610 A | * | 4/2000 | Enderle et al. ............... 285/94 |

* cited by examiner

Primary Examiner—Eric K. Nicholson

(57) ABSTRACT

Several embodiments of a wedgethread pipe connection are disclosed that have improved makeup, sealing, and non-loosening characteristics. In one embodiment, an open wedgethread is disclosed that has an included angle measured in the gap between the stab flank and the load flank to be not less than zero, so as to prevent premature wedging between mating flanks before the position of full makeup is reached, as does occur between trapped wedgethreads wherein the included angle is less than zero.

The invention may be used for pipe threads large or small, as a flush joint, with collars, screwed into plates or it may even be used to reversibly connect such as solid posts to base members where a wide makeup torque range is desired.

This Open wedgethread, as opposed to trapped wedgethreads, provides a threaded pipe connection that: is more cost-effective; can seal high pressure gas; can provide selectively a connection strength as high as the pipe strength; assures easy makeup to the desired position of full makeup within a wide torque range; may have a torque strength as high as the pipe torque strength; is easier to manufacture; is easier to gage; and is less subject to handling damage.

25 Claims, 3 Drawing Sheets

WEDGETHREAD PIPE CONNECTION

This Application is a Continuation of application Ser. No. 09/573,480 filed May 16, 2000, now abandoned, which was a Continuation-In-Part of application Ser. No. 09/421,483 filed Oct. 20, 1999, now abandoned, for the Non-Elected Invention thereof The U.S. Government has a paid-up license for this invention for Government use, as provided by the terms of Grant Contract DE-FG01-95EE-15608 funded the U.S. Department of Energy, under the Energy Related Inventions Program.

TECHNICAL FIELD

The use of conventional screw threads to connect joints of pipe together so as to convey fluid, is a very old art that has progressed for hundreds of years in an effort to satisfy periodic needs for stronger and better sealing pipe connections. Performance requirements for pipe connections still vary widely today, such as for home piping with less than 80 psi fluid pressure with virtually no mechanical loads, to Oil Well Pipe that may be required to hold over 15,000 psi gas pressure and simultaneously, withstand extreme mechanical loadings and endure wide temperature fluctuations. The use of conventional screw threads to connect structural members is also an old art.

Due to the historical weakness of threaded pipe connections and their tendency to loosen, leak, and/or break, their use in industrial plants and refineries has been limited by Industrial Codes to very small pipe sizes and low pressures. However, because there is no reasonable alternative pipe connection for use within the very limited hole sizes drilled for Oil & Gas Wells, threaded pipe connections are still used today, so most research on and development of pipe connections has been directed toward such use. Structural use of conventional screw threads has been limited by their weakness and their tendency to loosen while in service.

In 1939 API adopted the 8Rd thread connection to connect joints of API tubing and casing, which is still used to connect about 80% of well pipe today. My U.S. Pat. No. 5,427,418 filed in 1992 explained why API 8Rd Connections loosen and leak, and "API Item 2239 Work Group" discovered that fact in 1995 and recently adopted some principles of '418 into API "SR17 Supplemental Requirements for API LTC Connections with Specified Performance". In an effort to provide pipe connections that sealed better than API 8Rd Connections, special "Premium pipe connections" were developed by numerous other parties who adopted thin annular sealing lips at the end of their pin threads as depicted in my U.S. Pat. No. 2,766,998 that introduced proven reliable pressure-aided, high-pressure, high temperature metal seals to the nuclear and space industries as well as the oil and gas industry. However, such seals when used in oil-well pipe connections are fraught with several serious problems such as: leakage due to lip damage; excessive costs; and loss of connection efficiency when used in flush connections because the pipe wall thickness for supporting axial loads is reduced to form the lip and it's mating sealing surface. Today, most experts in the field believe that a lip seal is required "because pipe threads can't seal gas pressures above 10,000 psi" according to API SR17. There has been considerable confusion in the industry as to what constitutes a reliable qualification test for threaded pipe connections, which has resulted in too many sales claims reflecting hopes more than facts. New standard ISO-13679 gives promise to end that problem in that it allows one to choose the % efficiency ratings relative to the pipe ratings that a connection is to be tested and qualified for, under combinations of: internal pressure; external pressure; tension; compression; bending; temperature; and the choice of water or gas as the pressurizing fluid. It also specifies test procedures that accurately measure performance capability. Therefore, it is expected that the number of new connections offered for sale will decline in face of such stringent standards, but that real progress should accelerate because users can for the first time, begin immediate use of a new ISO qualified connection with confidence. Application for the instant invention is made with that realization in mind. For purposes of the present invention, the following definitions will apply.

Flank angle=The acute angle in a plane coinciding with the pipe axis, measured between a thread flank and a plane positioned 90 degrees to the axis, the angle being plus if the flank faces toward the crest, the angle being minus if the flank faces toward the root.

Included Angle=The algebraic sum of the stab flank angle and the load flank angle.

Thread Turn=A 360 degree portion of a screw thread.

Pin=A male threaded end, the thread turn nearest the pin face being the first thread turn.

Box=A female threaded pipe end formed to mate with pin threads, the thread nearest the box face, being the first thread turn.

Wedgethread=A screw thread form having a crest, root, stab flank and load flank, the load flank being formed on a greater helical angle than is the stab flank such that the axial length of the crest is least at the beginning of the first thread turn, the length gradually increasing to a maximum axial length at the end of the last thread turn, such that the box and pin may be screwed together to a desired position of full makeup at which, both stab flanks and load flanks contact and wedge against their respective mating flanks and thereby prevent further makeup of the connection.

Trapped Thread=A thread form having a negative included angle for at least a portion of the radial width of its flanks.

Open thread=A thread form having no negative included angle over the entire radial width of its flanks.

Metal-to-metal seal=A non-threaded surface formed completely around a portion of a box or pin that is in continuous contact with a mating surface of the other, so as to effect a seal against fluid within or outside of the connection.

Pin wall thickness=A dimension measured radially at mid-length of the engaged threads, extending from the pin thread pitch diameter to the pin bore.

Box wall thickness=a dimension measured radially at mid-length of the engaged threads, extending from the box thread pitch diameter to the box outer diameter.

Stab pitch=axial length between stab flanks, one thread turn apart.

Load pitch=axial length between load flanks, one thread turn apart.

Full-strength connection=a pipe connection that will seal and not rupture under any combination of loads at which, the VME yield stress of the box or pin wall is not exceeded.

Bridge thickness dimension=the maximum width of a gap formed between assembled mating threads that the thread dope used, will seal.

Angle of Friction=The arctangent of the co-efficient of friction, that acts between two solid bodies which slide against one another.

BACKGROUND ART

Moore U.S. Pat. No. 1,474,375 discloses an early form of a trapped thread, but not a wedgethread, that is sealed after assembly by compressing a malleable member between mating threads. Stone U.S. Pat. No. 2,006,520, discloses a square non-wedgethread form and seals elsewhere as at 39, 20 and 28, for a flush joint connection efficiency that "may be 53%", per Col 8 line 10. He claims no thread seal as made evident in Col 3 ln 5–9, Col 4 lines 3–9 and Col 6 lines 44–47. Rotation is stopped by contact of shoulders 20 and 34, not by the wedging of threads. Col 4 ln 49–53 indicate that sealing "face 39 which is complimentary in angularity to and adapted to seat in fluid-tight relationship with face 18", which precludes it's ability to form a reliable seal because rotation of the lower end of nose 39' will cause it to contact seat 18 only at the top of surface 39 whereupon, the lower end of surface face 39 will rotate and no longer be in contact with face 18. Had surface 39 been formed at an angle less than face 18 as taught by '998, then a surface seal may have been formed.

Blose Re. 30,647 discloses Trapped Wedgethreads that suggests a thread seal in Col 2 ln 7–11 but does not teach how to accomplish a thread seal and in fact, cites clearances between roots and crests in Col 3 ln 40–43. Conversely in Col 1 beginning at ln 64, he cites, "Since back flank is intended to always be negative, thread strain reactions against this surface will cause the box member to be pulled radially inward and the pin member to be pulled radially outward." The force of such pulling away of the box and pin threads from each other is transmitted through flanks having a small included which angle generates a very high axial force on the flanks which in turn, causes a premature resisting torque during makeup of the connection, which typically stops short of the desired position of full makeup. Thus upon assembly, the box and pin are left pulling away from each other with their mating roots and crests apart, such that excessive clearances left by stopping short of the ideal position of makeup and by complex machining tolerances of the dovetailed trapped wedge threads, are sure to produce leak paths. Then it is no wonder that with such leak paths guaranteed, that he requires a "primary resistance to leakage—by a separately functional metal-to metal seal" per Col 2 ln 12–15. Such seals occupy radial space of the pipe wall that in turn, further reduce the connection strength against axial loads.

Blose U.S. Pat. No. 4,600,224 discloses a trapped wedgethread and cites in Col 1 lines 56–60 that he provides a "controlled clearance between mating roots and crests". Nowhere does he claim a thread seal as he suggested in Re. 30,647, but provides metal-to-metal seals as at 12 of FIG. 1, as at 24 & 26 of FIG. 2, and as at 32 and 34 of FIG. 3 for the three embodiments disclosed. Col 4 lines 52–54 state that crests and roots do not make contact upon full makeup which precludes a thread seal, and nowhere does he claim a thread seal, which is understandable in light of experience with his prior invention. Col 5 lines 6–8 discuss the tendency of trapped threads to "hang up" during dis-assembly. Hang-up and damage are common deficiencies of sharp edge trapped wedge threads.

Blose U.S. Pat. No. 4,600,225 adds additional clearance as at 43 between mating threads to further confirm that he was not able to form a wedge thread seal.

Ortloff U.S. Pat. No. 4,671,544 further confirms lack of thread sealing attained by the inventions above having a common assignee, in that he provides a resilient seal (26) mid-point the mating threads and metal-to-metal seals as at 22 and 24 of FIG. 1. Col 2 ln 18–20 he mentions the threads seal but does not teach how. If those threads did seal, then his resilient seal and metal-to-metal seals would not be needed. The embodiment shown in FIG. 4 does not claim a thread seal, but claims a metal-to-metal seal as at 50.

Ortloff U.S. Pat. No. 4,703,954 explains in Col 1 ln 12–42 that trapped wedgethreads cause very high stress concentrations and the objects of his invention are to reduce those stresses. Although he claims a thread seal in claim 1, he does not teach how to achieve it.

Reeves U.S. Pat. No. 4,703,959 discloses a trapped wedgethread connection that seals on a soft seal such as polytetrafluoroethylene in Col 2 ln 6–17. Again, he claims a thread seal but does not teach how to accomplish it. Col 2 ln 50–59 explain that the seal material cannot escape from the groove which it completely fills, however, elevated temperatures encountered in the well will cause expansion of the seal which in turn will generate extreme pressures between box and pin sufficient to induce failure of the connection. If the threads sealed the contained fluid, the soft seal would not be needed.

Blose U.S. Pat. No. 4,822,081 discloses a trapped wedgethread but nowhere does he claim a thread seal, having no doubt witnessed tests on several of his inventions listed above. Instead, he cites seals as at 51 and 54. In Col 8 ln 36–37 he indicates that the thread must be trapped to be drivable, but he later witnessed tests on my connection having positive flanks, wherein his employer reported, "no energy loss", which confirmed that they were drivable indeed. Col 8 ln 47–53 and Col 9 ln 5–8 state, the critical area of the box will yield when being driven which precludes a high strength pipe connection particularly in tension, per Col 10 ln 39–42. Such yielding causes an energy loss, which is not desirable for a drive-pipe connection because it kills some of the impact necessary to drive the pipe into the ground. Col 8 ln 15 he states, "the thread flanks do not slide against one another, and in fact, the thread flanks do not make contact until final make-up of the joint" so therefore the large 40 foot long joint of heavy wall pipe must be tediously suspended and very carefully lowered while it is being rotated to carefully engage the sharp cornered mating threads, before being tightened to the position of full make-up, explained in Col 4 ln 22–24 and Col 6 ln 44–52 and Col 7 ln 47–57.

Mott U.S. Pat. No. 5,454,605 depicts a trapped wedgethread described in Col 2 ln 48–61 and illustrated in FIGS. 3 & 4. The stab flank is formed in the same direction, but at a different angle than the load flank so as to trap the thread, as opposed to the dovetail trapped wedge threads described in the patents above. He properly describes the assembly and disassembly problems and the damage susceptibility of dovetail wedge threads in Col 1 ln 51–Col 2 ln 2. His improvement is a connection particularly for use on drill pipe as detailed in Col 2 ln 18–23 & ln 48–55 which conveys drilling mud during drilling of the well only, which is typically less than a month. Mud is a much easier fluid to seal than oil or gas because solid particles in the mud collect to dam up whatever clearances may exist between the mating threads, whereas casing and tubing connections must seal against water, oil and/or gas for many years. In Col 2 ln 60–65, Col 4 ln 61–Col 5 ln 14, he claims a thread seal but again, does not teach how to seal against even mud. He states, "when made-up, there is no clearance between the threads" so not even thread lubricant is entrapped there between" but unfortunately, such perfect confirmation is and will always be beyond machining capability, and particularly within cost limitations for pipe connections. He depicts two embodiments of his invention, one in FIG. 3 to reduce flank hangup during assembly but not during disassembly, and a second embodiment in FIG. 4 to reduce flank hangup during disassembly but not during assembly. Drillpipe connections are typically made and unmade hundreds of times, so the reader is left to wonder which half of such damage is to be eliminated by use of his invention. Neither has he eliminated the sharp corners where the flanks and crest intersect, nor the damage he claims to be associated with such sharp edges.

Watts U.S. Pat. No. 2,766,998 teaches how to form an elastic metallic lip-seal and mating seat so as to effect a high-pressure seal against gas for many years while under conditions of extreme variations of pressure and temperature.

Watts U.S. Pat. No. 4,813,717 teaches how to form a box in a given size plain-end pipe so as to maximize the strength of a threaded pipe connection, for connection with another pipe end having a pin thread per claims 18 & 19, or for connection by a double-pin coupling per claim 2.

Watts U.S. Pat. No. 5,143,411 teaches how to form both a box and pin on plain-end pipe so as to maximize the strength of an integral threaded flush pipe connection.

Watts U.S. Pat. No. 5,018,771 teaches how to form a mating box and pin so as to facilitate assembly and prevent cross threading, in order to gain a more reliable and cost-effective connection.

Watts U.S. Pat. No. 5,427,418 teaches how to effect a thread seal which has been proven capable of sealing against high gas pressure, as high as the pipe rated pressure. When formed on 30"×1" wall drive pipe, a connection having 6 degree positive stab flanks per '418 was driven into the ground and tested very successfully, with "no indication of energy loss".

Watts U.S. Pat. No. 5,516,158 teaches a high-strength self-swaging connection having advantages that increase with the size of the pipe diameter. However, because it is swaged after threads are formed, it is not particularly suited for pipe sizes smaller than 5 inches.

Tubular connections in accord with some of the Watts patents listed above have been used successfully under severe conditions that no other known threaded pipe connection was capable of operating under however, like most threaded pipe connections, they require close torque control for proper make-up so as to withstand the loads, but not overstress the box and/or pin. The one proven good feature of wedgethread connections heretofore, is that they can withstand a wide range of makeup torque after repeated assemblies, however, experience has also proven them to leak, to be difficult to assemble, to be highly susceptible to damage, to be difficult to manufacture and inspect, and to lack strength against superimposed loadings.

Six of the wedgethread patents cited above have a common assignee and four name a common inventor which confirms that a long, careful and continuing improvement effort has been focused on wedgethreads for over 25 years. However, all efforts of record are devoted to trapped wedgethreads and none teach how Open (non-trapped) wedgethread may be workable or feasible to connect and/or seal a pipe connection. Experience has taught a characteristic of all Trapped Wedgethreads listed above, that the flanks typically engage before the ideal position of full makeup is reached which in turn, prematurely generates a very high torque sufficient to stop rotation short of full makeup. Such a condition allows the connection to leak and loosen, and such loosening reduces its ability to be driven or to serve as a mechanical support. Upon first rotation of such pins into such boxes, the crest-root gap and the load flank gap are very wide, so excess dope flows freely outwardly from the connection. The premature torque begins during makeup when thread dope thickness trapped in the gap between the last mating thread surfaces is reduced to the bridge thickness dimension. For included angles where that gap occurs between flanks, the applied torque generates very high fluid pressure on the dope which in turn, forces the stab flanks together which are already in intimate contact due to the weight of the pipe joint being stabbed, and the friction between stab flanks causes the high premature torque. For smaller included angles where that gap occurs between roots and crests, the pressurized dope prevents intimate root-crest contact, because the dope pressure acting on the crests and roots holds them apart while forcing all mating flanks into hard contact before the desired position of full makeup is attained. Hydraulic force of the dope is multiplied greatly by a factor equal to: cotangent (included angle/2+angle of friction).

SUMMARY OF THE INVENTION

The present invention is for use in various configurations such as with conventional double-box pipe couplings of larger diameter than the pipe, double-pin couplings, integral joint, flush joints, upset pipe ends, for connecting pipe to heavy wall vessels, and for reversibly connecting such as tubular or bar posts to their mounting base, with or without the use of thread dope. The invention may be practiced by selectively combining its various features in different combinations, as may be best suited for certain specific or general applications.

Open wedgethreads in accord with the present invention may be formed on a taper or alternatively, may be formed cylindrically. The dependable wedging action of my Open wedge thread provides a firm, repeatable position and torque at full makeup because no negative included angles exist whereas heretofore, trapped wedgethreads often trap excess dope between negative included angles which prevents their makeup to their ideal position of full makeup, as I have explained above. Prior cylindrical threads required a shoulder or such as a lock nut to provide a firm, repeatable position of full makeup. Use of the present invention for cylindrical wedgethreads requires the radial width of the load flank to equal the radial width of the stab flank, whereas radial width of a tapered wedgethread stab flank is greater than the load flank radial width. The present invention does not suffer premature flank lock-up as described above for trapped wedgethreads, because no negative included angles are used. When box and pin are formed with no difference in taper, my Open wedgethread allows the pin and box to momentarily deflect radially apart during makeup sufficiently for excess dope to escape, unlike trapped wedgethreads that cause lock-up when dope pressure prematurely engages the flanks.

For very fast makeup's, for very cold conditions, and for other conditions under which the dope may not fully escape from between mating threads on like tapers fast enough during makeup, the pin threads may be formed on a taper slightly less than the box taper, to insure that the first pin thread turn contacts the box threads before the other pin threads do, and then during makeup the other pin threads successively contact the box threads which progressively extrudes excess dope towards the thread end of larger diameter as makeup continues, and thereby prevents entrapment of excess dope between the mating threads. When substantially cylindrical threads are to be used, the pin threads may be formed cylindrically and the box threads formed with a very slight taper or, the box threads may be formed cylindrically and the pin threads may be formed with a very slight negative taper. As an example of the taper difference, I have successfully used a difference in thread interference between the ends of thread engagement according to my formula below for the value "PTS". It is generally known that entrapment of excess dope between any type mating threads can cause major problems. Therefore, unless a method for extruding excess dope is provided, any sealing thread that uses thread dope is subject to dope entrapment, so certain features may be combined in various embodiments of the present invention with a new Open type wedge thread that will assemble easily with a selectively wide range of final make-up torque, stop rotation of the mating threads at the desired position of full makeup, effect a seal against high-pressure fluid, and effect a high-strength rigid connection unlike the trapped wedgethreads of record. Industry experts have long held that to prevent thread jump-out, a negative thread flank angle was necessary and have therefore devised many complicated, expensive and hard to inspect thread designs, as the above cited trapped wedgethread patents disclose. However, tests run for me by an independent test lab disprove that widely held belief and are explained as follows. When a conventional pin having a relatively thin wall is made up into a box having a much thicker wall, then a jump-out tendency may exist because upon application of high axial tension loads, the thin pin wall tends to contract radially according to Poisson's ratio more than the thick box wall contracts because the box axial stresses are less than the pin axial stresses, which in the absence of a radial restraining force acting on the pin, may cause separation of the mating threads, a leak, and then possibly jump-out as loads increase. If a thread form has a high positive flank angle such as the 30 degree flank angle used on API 8Rd threads, jump out tendency is increased by vector forces in proportion to tangent(flank angle-friction angle), a fact that is generally known. However not generally known, is the fact that when the box wall thickness is reasonably close to the pin wall thickness, that the box will contract radially with the pin when the connection is subjected to an axial tension load, and will expand radially with the pin when the connection is subjected to an axial compressive load, sufficiently to prevent separation of the mating threads if the load flank angles are small. The present invention defines workable values "M" for diametrical thread interference to allow this feature to be safely used in combination with a new Open type wedgethread, to prevent such thread separation.

For connections having box and pin walls of substantially different thicknesses, compressive axial loads imposed could cause a thinner box to expand radially away from the pin so as to lose the desired thread interference. Likewise, a tensile axial load imposed on a thin pin could cause it to contract radially away from the box so as to cause it to lose the desired thread interference. Therefore, axial loads may be limited independently to prevent such a loss, in accord with my formulas given below for values BCS and PTS.

The sharp corners of trapped wedgethreads of record are extremely subject to damage and hangup as Mott describes in '605 above and even more importantly, they are difficult and time consuming to stab and makeup in the field which wastes Rig-Time that can exceed a cost of $500,000/day. They also increase the tendency for damage, galling and leaking which may require extremely expensive remedial work under dangerous conditions that often damage the environment. The present invention provides an Open wedgethread having generous radii that connect flanks and crests so as to prevent such difficulties.

Tests have historically confirmed that makeup torque of a non-wedgethread connection varies with many factors such as thread surface finish, box-pin radial thread interference, the dope used, the taper, the rotational speed of make-up, the temperature and the flank angles etc. so therefore, a makeup torque that is independent of such characteristics is desirable to reduce time, cost and effort required to assure proper make-up repeatability of the connection and most importantly, to prevent overstress of the box and pin. The present invention utilizes a new Open wedgethread having a simpler and more reliable configuration than do trapped wedge-threads, so as to assure repeatable make-ups to the desired full makeup position with a given torque, and not be subject to so many torque variations.

The present invention provides a new Open wedgethread that is easier and less expensive to manufacture, inspect and assemble than are trapped wedgethreads, which have sharp corners and negative flank angles. Trapped wedgethreads have many dimensions that must be controlled such as the crest axial length, the root axial length, the load flank radial width, the stab flank radial width, the stab flank angle, the load flank angle, surface finish of the almost hidden stab flank, surface finish of the almost hidden load flank, tiny almost hidden radii at the roots that induce severe stress concentration, tiny crest radii that induce damage and galling, the load flank lead, the stab flank lead, the diameters of the crests, the diameters of the roots, etc. and all dimension must have close tolerance limits they cannot exceed in order to even screw the box and pin together. The difficulty of maintaining tolerances during manufacture increases with the Square of the number of related tolerances. Thus, it is evident why Blose and others provide multiple independent seals other than depend on trapped wedgethreads to seal. If the trapped wedgethreads of record did seal, a few thread turns would seal and all the other types of seals would not be necessary. The present invention provides a new Open wedgethread form that may have flanks positioned at or near 90 degrees to the pipe axis, which allow easy entry of cutting tools and easy chip removal during manufacture. Also, such threads prevent portions of the thread flanks, roots or radius from being hidden, and allow easy entry of gages and sight checks for simple thread inspection. Thus, the present invention allows the threads to be machined in a more conventional, simpler, more reliable and less expensive manner, such that the threads can effect a fluid seal. To measure the precise thread form during manufacture of pipe connections, it is a common inspection practice today to trace the threads as on a fifty-to-one scale, and/or to make a hard rubber mold of the thread form to check on an optical comparator. However, neither practice is suitable to check a trapped wedgethread form, which further impedes the ability to manufacture such pipe connections accurately, and explains additional reasons for their assembly and sealing problems so widely experienced.

Relatively wide stab flanks and generous radii of the preferred embodiment using tapered threads are made possible by my relatively steep taper. When lowered into the box for assembly, the stab flanks rest upon a complimentary stab flank of the box to support the pipe joint being installed, which also positions the pin over halfway into the box as taught by my U.S. Pat. No. 5,018,771, such that alignment is automatic, such that cross-threading cannot occur as Mott described in '605. I generally prefer such tapers to be ⅛ to ¼ diameter change of any given axial thread length, for instance, a 3/16" diameter change in an axial length of one inch however, other tapers are within the scope of the present invention. Ideally, the taper should increase with an increase of wall thickness as necessary to prevent excessive thread lengths. To prevent taper lockup between pin crests and box crests when the pin is stabbed into the box, it is preferred that the crests and roots be positioned parallel to the pipe axis. For tapered wedgethreads, the stab flank must have a greater radial width than the load flank, and the preferred values are defined in the formulas given below as "S" and "B". The difference in the load flank axial pitch and the stab flank axial pitch for a given diameter defines the wedging angle between adjacent thread turns and if it is too great the threads may loosen and leak, but if it is too small the desired position of full makeup may not be reached. My preferred difference in axial pitch may be found by the formula given below for the value "J", and preferred values for the load flank axial pitch and the stab flank axial pitch may be found by the formulas for "LF" and "SF" respectively.

It is a further object of the present invention to provide an Open wedgethread that is highly resistant to handling damage during manufacture, shipment and installation, in that no sharp corners exist between the metal faces forming the corners, but have crests positioned at approximately 90 degrees to the flanks connected, by generous radii so as to thereby survive reasonable handling without significant damage. To even further minimize effects of localized crest damage too small to notice visually during assembly, the present invention teaches that the thread flank widths be dimensioned and toleranced such that the pin roots contact the box crests upon assembly but hold the pin crests which are most subject to damage, apart from the box roots so as to prevent interference and galling there between. It is within the scope of the present invention for the box roots to contact the pin crests and for the pin roots be held apart from the box crests, but this damage prevention feature would be lost along with the best sealing configuration, explained as follows: At the small diameter end of thread engagement, the axial length of the pin root-box crest contact of a wedgethread is necessarily much longer than the axial length of the pincrest-boxroot contact, so my preferred embodiment provides that the longer length pinroot-boxcrest lengths be in certain intimate contact to minimize leak tendency there where fluid pressure is typically the greatest, and that the shorter lengths define a gap not greater than the bridge dimension, to be sealed by thread dope. So as to help maintain the previously discussed intimate pinroot-boxcrest contact after make-up of the connection, a predetermined amount of radial interference is preferred to exist between the box and pin threads sufficient to generate an optimum tension hoop stress in the box and a compressive hoop stress in the pin. Should box makeup hoop stress be excessive, then the connections rating against internal fluid pressure could be reduced, or should pin makeup hoop stress be excessive, then the connections rating against external fluid pressure could be reduced because such stresses are additive to hoop stresses generated by fluid pressures. Therefore, the present invention teaches that the preferred diametrical interference between the mating box and pin threads should approximate the quantity: ⅓ times the pipe O.D. times the pipe material yield strength, divided by the pipe material modulas of elasticity. For best performance, thread interference should extend all along the helical thread length to both ends of the engaged threads, which should be considered when diameter and taper tolerances are specified. Such a controlled interference should allow reliable service near maximum ratings.

For extreme service requirements or because a user specification requires it, metal-to-metal seals to augment or replace the thread seal, may be provided adjacent either or both ends of the engaged threads. Most often, such a sealing surface is positioned adjacent the pin end for cooperation with a mating sealing surface formed within the box adjacent the small diameter end of the box threads, so as to reduce the sealing diameter against internal fluid pressure to a minimum and thereby, reduce the fluid pressure load on the connection to a minimum. Occasionally it may be required to provide a metal-to-metal seal adjacent the large diameter end of the mating threads by forming an inner diameter surface of the box adjacent it's end for cooperation with a mating sealing surface formed around the pin adjacent the large diameter end of the pin threads. Such an external seal will provide maximum resistance against external fluid pressure and may also be required to prevent corrosion of the threads in extreme cases. When such seals are required in a pure flush-joint connection, then the wall thickness required for the seal lip thickness is lost to use for mechanical strength of the connection, however, by use of my In-Process-Swaging taught in parent application Ser. No. 09/421,483, a full strength near-flush connection may be provided at a cost lower than costs for Upset or full swaged connections. An optional feature of the present invention to enhance connection strength and sealability is to dimension the axial length of the gap to be sealed at a minimum, and to maximize the number of thread turns within the desired length of thread engagement for a given minimum starting crest length, which is accomplished by dimensioning the least axial crest length of the first pin thread turn to be substantially equal to the least axial crest length of the first box thread turn. My formulas given below for the mean axial pitch labeled "A" will allow future designers to determine such dimensions for any size connection. Then, based on the value of "A", the stab flank lead and the load flank lead may be found by my formulas for "SF" and "LF" respectively shown below. Thus, other non-workable, wasteful and/or dangerous factors may be avoided.

To effect a thread seal, the gap width existing between crests and roots after mating flanks wedge in firm contact, must not exceed the bridge thickness dimension. In the preferred embodiment of the present invention, that gap width is controlled by the radial width of the stab flanks and the radial width of the load flanks, the previously mentioned pin root-box crest radial interference being maintained. It is easy to say that a pin crest contacts the box root simultaneously as the box crest contacts the pin root, but machining tolerances prevent such from happening and to even approach that idealistic condition would be excessively expensive for the manufacture of pipe connections. Therefore, a maximum gap width must be defined and not exceeded in practice, for the threads to be able to seal. As I explained in '418, the maximum-allowable gap when using API 5A2 Modified Dope was measured as substantially 0.006". Dimensions and tolerances for flank widths of the present invention are best set to maintain a gap width no greater than 0.006" when the mating flanks are in firm wedging contact at the position of full make-up when API 5A2 Modified thread dope is to be used for assembly of the connection. In keeping with standard production practice, the target gap width is preferably about half of the bridge thickness dimension.

Another feature of the present invention is explained as follows. At the position of full makeup, mating wedgethreads having a zero included angle are wedged tightly together and there is no tendency for threads to be forced out of their mating grooves by excessive torque. The same is true if the included angle is less than twice the resulting angle of friction for a given thread dope. If non-wedgethreads were formed with such a small included angle, flank lockup would occur when flanks first engage, long before the position of full makeup was reached to effect the desired radial interference between mating threads and therefore desired connection strength, would not be attained. With my open wedgethreads, radial interference is effected by root-crest interference before and independently of the final torque magnitude, which can occur only when the flanks wedge at the full makeup position.

There are service applications for wedgethreads that do not require maximum torque resistance, and/or highly stressed box and pin that my previously described embodiments allow for and for them, the following embodiment has certain advantages, such as to improve thread cutting tool geometry in certain instances. The flanks may be formed with an included angle that is greater than twice the angle of friction. The axial wedging pressure on the flanks is many times greater than the pressure between roots and crests due to the very small, helically configured wedging angle between stab and load flanks. The radial force vector of the wedging force tending to separate the threads equals the wedging force times tangent (included angle/2−angle of friction). It is therefore evident that no such force will exist if the positive included angle does not exceed twice the angle of friction between the flanks. Should it be desired that the included angle exceed twice the angle of friction, then engineering calculations must confirm that box and pin walls are thick enough to retain that force without being overstressed, before such an included angle is used. A zero degree included angle is preferred to eliminate any concern of such separating tendency, but wedgethreads having positive included angles greater than zero are clearly within the scope of the present invention.

Thus, it is now clear that the present invention teaches how to form a cost-effective high strength open wedgethread pipe connection that may be easily and repeatedly assembled to a desired position of full make-up within a wide torque range, so as to seal high pressure gas or liquids, while simultaneously withstanding extreme mechanical loads.

Preferred dimensions for my wedge threads not taught heretofore by background art, may be determined per the following example however, the scope of the present invention is not intended to be limited thereby.

D=Pipe design O.D.=The mean diameter within the O.D. tolerances for pipe ends.
PPF=Nominal pounds per foot of length for the pipe to be connected.
d=Pipe design I.D.=$(D^2-PPF/2.67)^{0.5}$
t=Pipe design wall thickness=$(D-d)/2$
W=Radial width of pin load flank=$<t/6$=$<$Starting axial length of thread crest
BL=Desired box thread P.D. at largest diameter of engagement.
BS=Desired box thread P.D. at the smallest diameter of engagement.
T=Conical thread taper=diameter change/axial length= 0.1875 preferred
L=Length of engaged threads=$(BL-BS)/T$, (except when conical threads are chosen)
J=Load flank axial pitch-Stab flank axial pitch=0.0025+ 0.00036×D=(ANSI RC5 Fit@ 1 turn)
A=Mean axial pitch=$W+(W^2+J\times L)^{0.5}$
LF=Load Flank axial pitch=$A+J/2$
SF=Stab Flank axial pitch=$A-J/2$
N=Number of Thread turns=$L/A$ S=Radial width of pin stab flank=$W+A\times T/2$, (+/−0.001" tolerance)
B=Radial width of box load flank=W+0.003",(+/−0.002" tolerance), with API 5A2 Mod dope.
C=Radial width of box stab flank=S+0.003",(+/−0.002" tolerance), with API 5A2 Mod dope.
Y=Pipe material unit yield strength
E=Pipe material modulas of elasticity
M=Preferred thread interference on diameter=$2/3\times D\times Y/E$
PS=Pin thread P.D. at small end of thread engagement= BS+M
PL=Pin thread P.D. at large end of thread engagement= BL+M
PB=Pin bore
PE=Pin % efficiency=$100\times[PL+W\times(A-W)/A]^2-PB^2/(D^2-d^2)$
BE=Box % efficiency=$100\times[D^2-(BS-W\times(A-W)/A)^2]/(D^2-d^2)$
PR=Poisson's ratio for pipe material
R=Ratio of, Box wall thickness to Pin wall thickness
BCS=Box axial compressive stress limit=$M\times E/[PR\times D\times(R+1)]$
PTS=Pin axial tension stress limit=$R\times BCS$
TID=Thread interference at small end minus interference at large end=0.002"×(BL+BS)/2

DETAILED DESCRIPTION OF PREFERRED EMBODIMENTS

Figure 1:
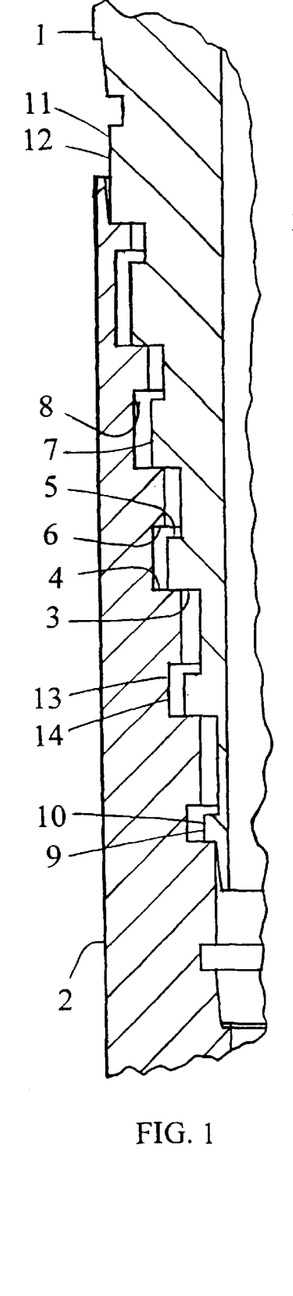
FIG. 1 depicts a fragmentary section of a box and pin of the connection at stab position.
Figure 9:
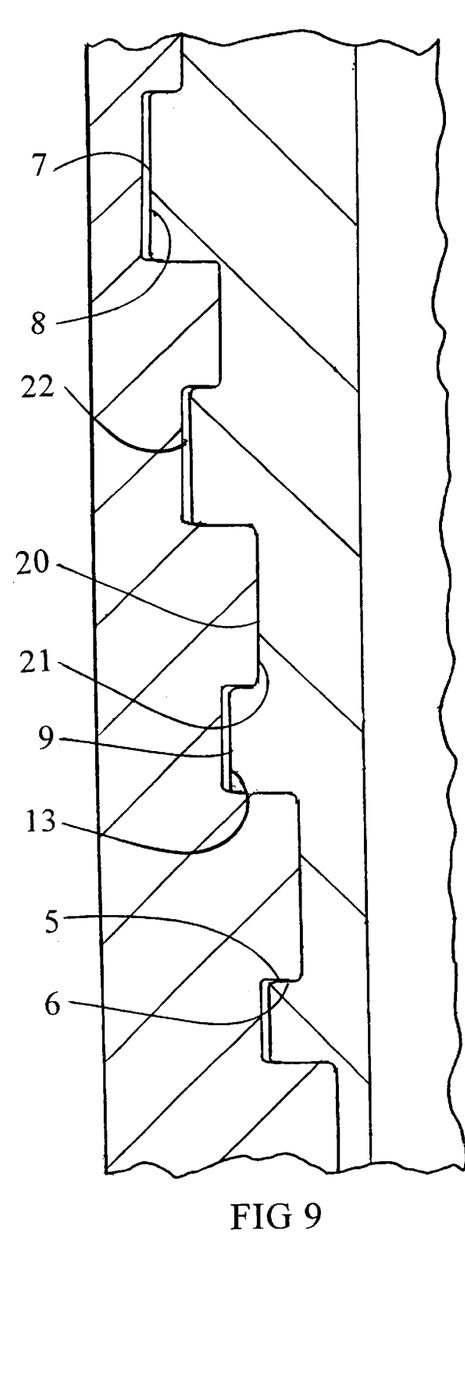
FIG. 9 from FIG. 2, depicts a bridge thickness dimension of the pin crest-box root gap width.

Multiple-start wedgethreads are within the scope of the present invention but for brevity, only a one-start thread is described. FIG. 1 depicts Pin 1 at stab position within Box 2 such that helically configured pin stab flank 3 and the weight of the pipe joint it is formed on, is supported by helically configured box stab flank 4. Pin load flank 5 and box load flank 6 are not then in contact with each other. Stab position is attained by lowering the pin into the box without rotation, wherein thread turns of the pin pass downwardly through thread turns of the box until the pin stab flank of each turn contacts a box stab flank turn too small in diameter for it to pass through, such that the pin stab flank rests on the box stab flank whereupon, pin crest 7 is in horizontal alignment within box root 8. Both root and crest are preferably formed parallel to the connection axis so as to prevent taper lockup during stabbing and also, to provide wider flanks. Axial length 9 and diameter 10 of the pin thread crest are least at their lower beginnings, gradually increasing to maximum axial length 11 and maximum diameter 12 at it's upper ending. At stab position, axial length 13 of box root 14 is a constant amount of length greater than then adjacent axial length 9 of pin crest 7 such that when relative rotation of the box and pin occurs to effect makeup of the connection, slippage occurs between stab flanks and the pin thread crest moves helically downwardly and toward the box root and toward the fill make-up position shown in FIG. 2 at which, pin thread flanks wedge between the box thread flanks because then adjacent lengths 9 of the pin thread crests and 13 of box roots become substantially equal, and pin load flank 5 abuts box load flank 6 to stop rotation at the desired position of full make-up. Shortly before such wedging occurs, radial interference between pin thread root 20 and box crest 21 occurs to insure that no gap exists between them upon make-up, but gap 22 of predetermined width is simultaneously formed between pin crest 7 and box root 8 as shown in FIG. 9. The radial width of stab and load flanks of both box and pin must be dimensioned and toleranced such that the width of gap 22 as shown in FIG. 9 at the position of full make-up is no greater than the bridge thickness dimension. The pinroot-boxcrest contact just described has advantages over pincrest-boxroot contact because: the pin crest is much more subject to damage than any other surface of the threads and therefore for the preferred embodiment, galling during make-up and leakage after installation is much less likely because the pin crest is held out of contact with the box root; and because the certain intimate pin root-box crest contact axial length at the minimum diameter of thread engagement is greater than the axial length of the pin crest-box root contact, sealing ability is greatly enhanced.

Figure 2:
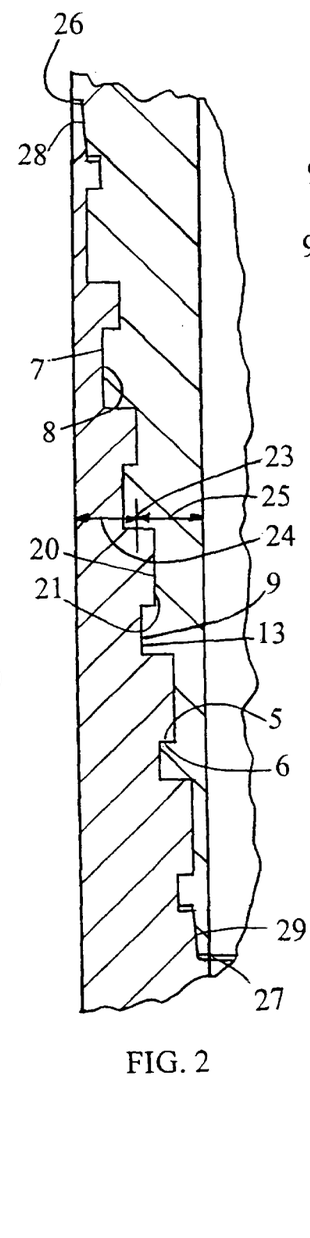
FIG. 2 depicts the connection of FIG. 1 at the position of full make-up.

As seen in FIG. 2 at mid-length of thread engagement 23, the box thickness is measured radially between the thread pitch diameter and box O.D. as at 24, and the pin thickness is measured radially between the thread pitch diameter and the pin I.D. as at 25. Axial space may be formed where needed as at 26 and 27 to relax end-length tolerances while insuring that the shoulders will not abut before the threads become wedged to establish the position of full make-up. To maximize connection strength as is well known in the art, partial threads may extend beyond the ends of full depth thread engagement so as to increase the critical area at the last engaged threads at both the large and small diameter ends of thread engagement, however such partially engaged threads will not seal.

Figures 3, 4, 5, 6, 8:
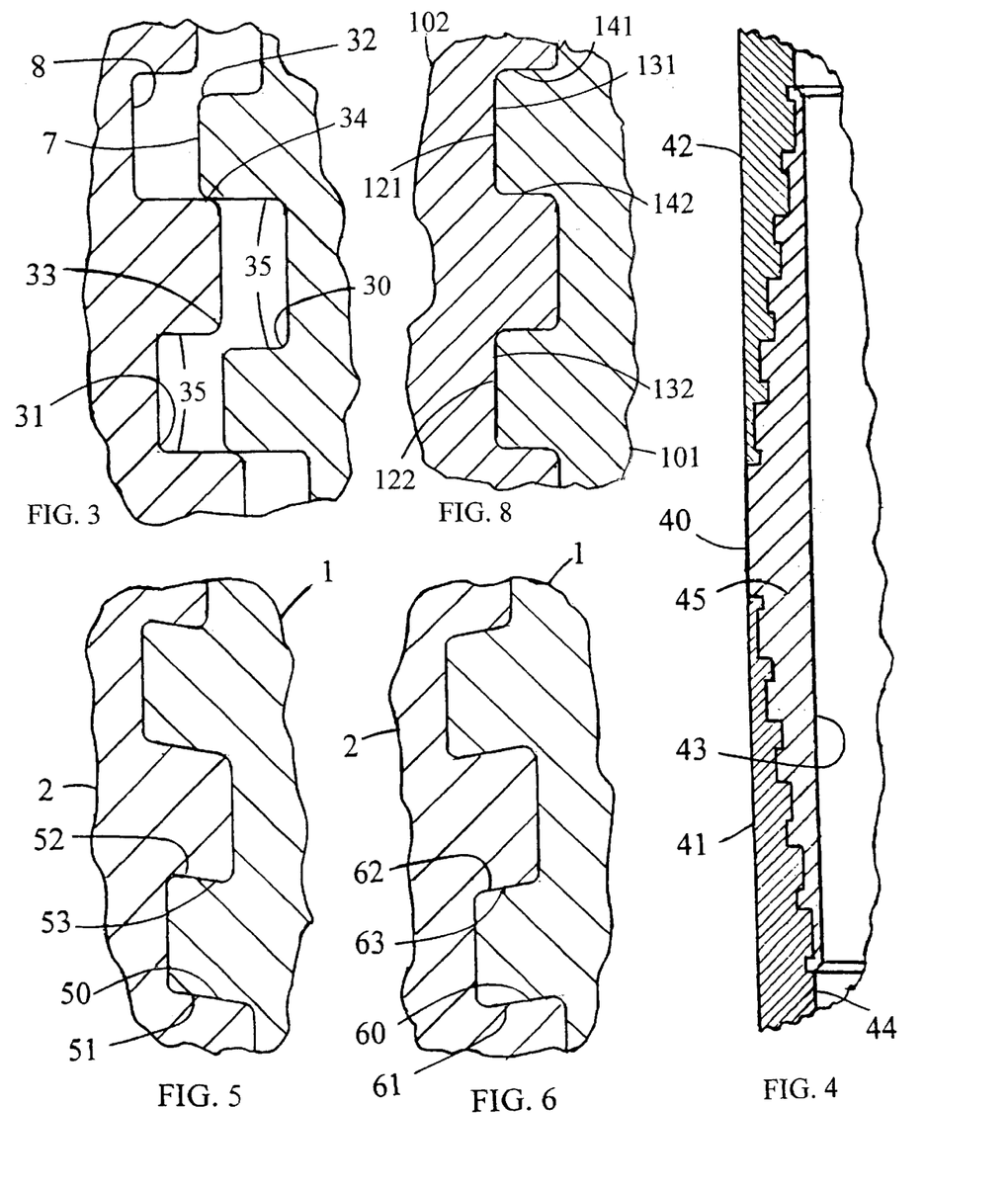
FIG. 3 depicts an enlarged fragmentary thread section taken from FIG. 1.
FIG. 4 depicts a fragmentary section of another embodiment using a double-pin coupling.
FIG. 5 depicts a fragmentary section showing a variation of the flank angles.
FIG. 6 depicts a fragmentary section of another variation of the flank angles.
FIG. 8 depicts a fragmentary section formed with cylindrical Open wedgethreads.
Figure 7:
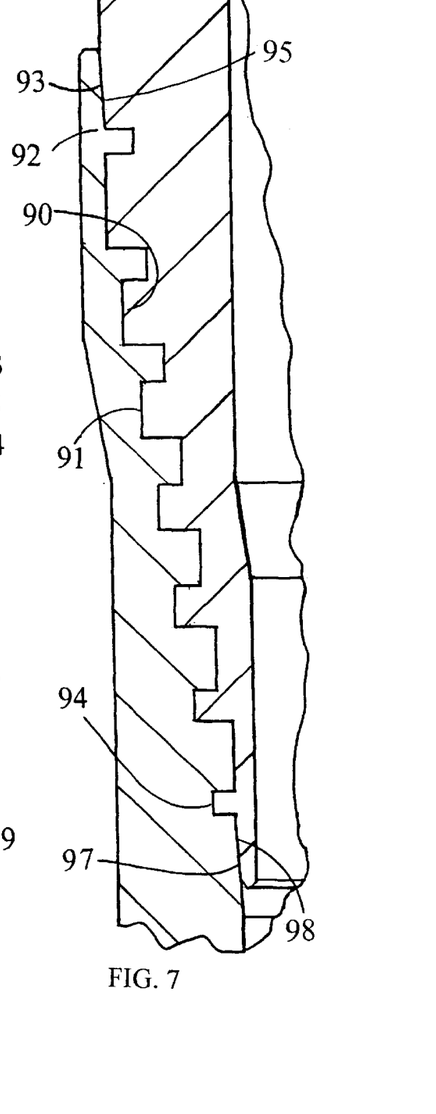
FIG. 7 depicts a section of a swaged pin and box after assembly.

Although my fully engaged Open wedgethread will seal against high pressure gas, when special user specifications require or when it is necessary to optimize the sealing area, mating metal-to-metal sealing surfaces taught by my '998 patent may be selectively provided as at 28 and 29 of FIG. 2, or at 93 and 97 of FIG. 7 or similarly, for the embodiment depicted in FIG. 4. Such seals may comprise cylindrical or conical surfaces wherein pin sealing surface 93 of FIG. 7 is of slightly greater diameter than is mating box sealing surface 95 so as to effect an interference fit upon assembly, and/or pin surface 97 is likewise of slightly greater diameter than is mating box surface 98 when radial interference is chosen to effect sealing pressure.

The enlarged thread form detail of FIG. 3 depicts generous concave radii 30 joining the pin root to flanks, and like radii 31 of the box that are typically but not necessarily, about 15% of the load flank radial width to reduce stress concentration. Also shown are even larger convex radii 32 joining pin crest to flanks and like radii 33 of the box, which greatly reduce damage during handling, transport, storage and assembly, as compared to the damage susceptibility of sharp-edged trapped wedgethreads. Threads formed per FIG. 3 also provide a stable support by contact of the stab flanks as at 34 for the pipe joint being stabbed, that avoids the tedious handling required during assembly of trapped wedgethread connections and they also provide automatic axial and concentric alignment of the connection to automatically register pin crests with longer box roots so as to assist proper assembly required to assure a reliable connection. Included angle 35 measured in the gaps between the threads may equal zero degrees or it may be a positive angle less than twice the angle of friction, or it may be a positive angle greater than twice the angle of friction.

Load flanks are preferably formed parallel to the stab flanks such that included angle 35 in FIG. 3 equals zero, primarily for the purpose of improving dimensional accuracy to assure a fluid seal and to reduce costs to manufacture and inspect the connection. The improved dimensional accuracy teaches a cost-effective wedgethread seal not hitherto attained. Both flanks are formed preferably at 90 degrees to the axis but not necessarily. For instance, when box wall thickness 24, and pin wall thickness 25 are reasonably close in dimension, then the wedging force and the diametrical interference will cause the box and pin to contract and expand together when under superimposed loads without need of a reserve radial restraining strength of the tubular member that the threads are formed on to prevent separation of the mating threads which in turn, prevents leaking and/or jumpout. Should box and pin thickness difference be extreme and the axial load be so near the rated load that the radial thread interference in the thinner wall member is overcome by the radial force causing differential diametrical strain, then stab flanks 50, 51 and load flanks 52, 53 may slant upwardly away from the axis per FIG. 5 if tension loads are of greatest importance for a given application, or stab flanks 60, 61 and load flanks 62, 63 may slant downwardly away from the axis per FIG. 6 if compressive loads are of greatest importance for another application. In either case, they should slant at an angle sufficient to resist radial mechanical forces that would otherwise cause differential strain, to thereby prevent separation of the mating threads.

Although the preferred value of the included angle 35 is zero for general use, a small positive included angle may be desired in certain cases, such as to improve thread cutting tool geometry for use on machines not having the full capabilities of modem threading machines. In such cases, the included angle may be as much as 2 degrees with little fear of thread separation when API Mod 2 thread dope is used because it is generally considered to have a 1.2 degree angle of friction between pipe threads. Should the required makeup torque and the load rating of a connection be low enough such that both box and pin have sufficient excess strength to resist thread separation, then the included angle may be formed greater than 2 degrees providing that engineering calculations and/or proof tests confirm that fact before such a connection is placed in service. API considers the coefficient of friction for API Mod 2 thread dope to be 0.021 and the arctangent of 0.021 is 1.2 degrees, which is the accepted angle of friction between API pipe threads. Thus, if included angles are no greater than twice 1.2 degrees, then the torque applied to the connection will not tend to cause the threads to be forced radially out of their mating grooves. When the included angle is more than twice the angle of friction, the tendency of the wedging force to force the threads out of their mating grooves increases directly as the tangent (included angle/2−angle of friction). For instance, if an included angle of 10 degrees is used, the force tending to separate the threads=tangent (10/2−1.2)×the wedging force=1/16 of the wedging force. In such a case then, box and pin wall thicknesses must necessarily provide a reserve restraining force greater than 1/16th of the wedging force so as to prevent separation and withstand all other operating loads, while not overstressing the tubular walls on which the threads are formed. Therefore, for such connections, engineering calculations and/or proof tests that consider box and pin wall strength, thread dimensions, the assembly torque and service loadings, must confirm the design to be reliable before it's use.

FIG. 8 depicts an embodiment of the present invention wherein pin 101 and box 102 are formed with substantially cylindrical threads, box root 131 being of like diameter as the adjacent box root 132, and box load flank width 141 being the same as box stab flank 142. However, should it be desired to positively extrude all excess dope during makeup, then the box threads may be formed with a very slight taper having greatest diameter at the box face, or the pin threads may be formed with a very slight taper of greatest diameter at the pin face, either case having a total radial thread interference well within the desired amount of radial thread interference for the connection as defined herein.

Figure 10:
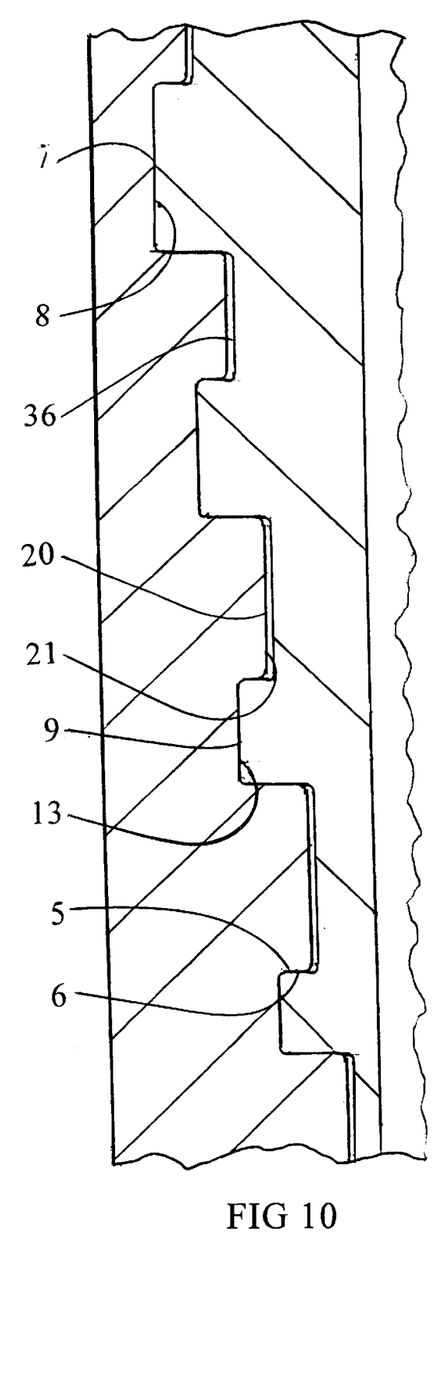
FIG. 10 from FIG. 2, depicts a bridge thickness dimension of the pin root-box crest gap width.

FIG. 10 is a fragmentary central section taken from FIG. 2 which depicts an alternate embodiment to the embodiment of FIG. 9, wherein pin crests and box roots are in firm contact at makeup, and wherein gap 36, having a width no greater than the bridge thickness dimension, is formed between the pin roots and the box crests. This embodiment may be used in services for which, the advantages explained above for the embodiment of FIG. 9 are not required.

I claim:

1. A threaded connection having a box (2) and pin (1) formed with mating wedgethreads, the box threads having crests (21), roots (8), stab flanks (4), load flanks (6), the pin threads having crests (7), roots (20), stab flanks (3) and load flanks (5), and an included angle (35) measured between the load flank and stab flank of both the box and pin, comprising: the threads being open wedgethreads such that the included angle is not less than zero degrees.

2. A pipe connection having a box (2) and pin (1) formed with mating wedgethreads, the box threads having crests (21), roots (8), stab flanks (4) and load flanks (6), and the pin threads having crests (7), roots (20), stab flanks (3), load flanks (5) and an included angle measured in a gap between each set of load and stab flanks, wherein box root (8) and pin crest (7) comprise an outer set of cooperating surfaces, and box crest (21) and pin root (36) comprise an inner set of cooperating surfaces, the wedgethreads being coated with thread dope suitable to seal and lubricate between the mating threads, comprising: a bridge thickness dimension (22) that defines the widest gap the dope will seal between the mating threads; a position of full makeup being attained when all stab flanks and load flanks are in contact with their mating flanks; the diameters of the roots and crests being dimensioned such that before the position of full makeup is attained during assembly, intimate radial interference is initiated between either pair of cooperating surfaces such that at the position of full make-up, a desired magnitude of radial interference exists there between so as to maintain their intimate contact with each other, and a gap exists between the other pair of cooperating surfaces, the gap being of a magnitude no greater than the bridge thickness dimension.

3. The connection of claim 2, further comprising: the included angle being not less than zero degrees.

4. The connection of claim 1 or 2 further comprising: the threads being tapered threads that taper from a small diameter of engagement to a large diameter of engagement.

5. The connection of claim 1 or 2 further comprising: the threads being cylindrical threads.

6. The connection of claim 4 further comprising: the included angle (35) being zero degrees.

7. The connection of claim 4 further comprising: the included angle being not more than twice the angle of friction that acts between the mating threads.

8. The threaded connection of claim 4 having a limiting design stress whereupon makeup, the mating flanks of the wedgethreads exert a wedging force against their mating flanks, the wedging force having both an axial component and a radial component, further comprising: the included angle (35) being more than twice the angle of friction that acts between the mating threads; the box (24) and the pin (25) having sufficient reserve strength in addition to strength required to withstand the desired makeup torque and all other operating loads without the walls becoming stressed higher than the limiting design stress, so as to prevent separation of the mating threads urged by the radial component of the wedging force.

9. The connection of claim 4 further comprising: the threads being coated with thread dope suitable to seal and lubricate between the mating threads; a bridge thickness dimension (22) that defines the widest gap the dope will seal between the mating threads; there being no gap between the mating threads wider than the bridge thickness dimension.

10. The connection of claim 4 wherein the mating threads each have a taper tolerance and a desired degree of radial interference further comprising: the magnitude of the desired radial interference together with the taper tolerances, being sufficient to cause a predetermined range of thread interference to extend substantially along the helical length of thread engagement.

11. A pipe connection per claim 4 further comprising: a diametrical interference between the mating threads at a mid-point (23) of thread engagement when at the position of fill makeup being substantially equal to the quantity, two-thirds of the pipe outer diameter times the pipe material unit yield strength, all divided by the modulas of elasticity of the pipe material.

12. A threaded connection per claim 4 wherein the mating wedgethreads having a predetermined axial length of thread engagement, the threads having a stab flank axial pitch length and a load flank axial pitch length, comprising: the least axial length (9) of the first pin thread crest (7) being dimensioned substantially the same magnitude as the least axial length (11) of the first box thread crest (16), so as to maximize the number of thread turns within the length of thread engagement for that least axial crest length.

13. The connection of claim 4 further comprising: the thread taper being not more than 0.25.

14. The connection of claim 4 formed about a tubular axis further comprising: the crests (7) and roots (8) being positioned parallel to the connection axis.

15. The connection of claim 4 further comprising: the threads being coated with thread dope to seal and lubricate between the mating threads; a bridge thickness dimension (22) that defines the widest gap the dope will seal between the mating threads; the radial width of the box load flank (6) being greater than the radial width of the pin load flank (5), but by not more than the bridge thickness dimension; the radial width of the box stab flank (4) being greater than the radial width of the pin stab flank (3), but by not more than the bridge thickness dimension.

16. The connection of claim 4 further comprising: the threads being coated with thread dope to seal and lubricate between the mating threads; the box thread being formed on a taper slightly greater than the pin thread taper such that when assembly of the connection begins, the first thread turn of the pin thread (10) will contact a box thread turn around its periphery before any other pin thread turn does, after which as makeup continues, other pin threads will successively contact the box threads around their periphery and thereby cause substantially all excess dope to be progressively extruded toward the large diameter end, from between the matin threads upon reaching the full makeup position for the connection.

17. The connection of claim 4 wherein the stab flanks of both box and pin have a constant axial pitch length, the load flanks of both box and pin have a constant axial pitch length greater in magnitude than the stab flank axial pitch length, a mean axial pitch length being equal to the mathematical average of the stab flank and load flank axial pitch lengths, the axial length (9) of the thread crest at the beginning of the first thread turn (10) being a first dimension, the load flank axial pitch length minus the stab flank axial pitch length being equal in magnitude to a second dimension, comprising: the mean axial pitch length being substantially equal in magnitude to the quantity, the square of the first dimension, plus the second dimension times the length of engaged threads, all raised to the 0.5 power, plus the first dimension.

18. The connection of claim 4 wherein the axial pitch of the pin and box load flank are equal, the axial pitch of the pin and box stab flanks are equal, further comprising: the axial pitch of the load flank (5) minus the axial pitch of the stab flank (3), being substantially equal to the sum of, 0.0025 inches plus, 0.00036 times the outer diameter of the pipe.

19. The connection of claim 17 further comprising: the load flank (5) axial pitch length being substantially equal to the quantity, the mean axial pitch length plus one-half of the second dimension; the stab flank axial pitch length being substantially equal to the quantity, the mean axial pitch length less one-half of the second dimension.

20. The connection of claim 4 further comprising: the stab flank angle being positive, the load flank angle being negative.

21. The connection of claim 4 further comprising: the stab flank angle being negative; the load flank angle being positive.

22. The connection of claim 4 further comprising: the pin having an external sealing surface (97) formed around its periphery adjacent the small diameter end of the thread so as to cooperate with a mating sealing surface (98) formed within the mating box adjacent the small diameter end of the thread and thereby form a metal-to-metal seal against fluid pressure from within the connection.

23. The connection of claim 4 further comprising: the pin having an external scaling surface (93) formed around its periphery adjacent the large diameter end of the thread so as to cooperate with a mating sealing surface (95) formed within the mating box adjacent the large diameter end of the thread so as to thereby form a metal-to-metal seal against fluid pressure from outside of the connection.

24. The connection of claim 16, further comprising: the diametrical thread interference at the small diameter end (10) of the engaged threads being greater than the diametrical thread interference at the large diameter end (12) of the engaged threads by the quantity substantially equal to, the thread mean diameter (23) times two-thousands of an inch.

25. A threaded pipe connection having a box (2) and pin (1) formed with tapered mating wedge threads for assembly with the use of thread dope, the thread dope being a desired mixture of grease and solid particles suitable to lubricate and seal between the mating threads, a bridge thickness dimension (22) above which the solid particles will not seal gaps between mating threads, the threads having crests, roots, stab flanks, and load flanks, comprising: the stab flanks being positioned parallel to the load flanks; concave radii (30) being formed at the junctures of the roots and flanks; convex radii (32) at least as great as the concave radii being formed at the junctures of the crests and flanks; the radial width of the pin stab flank (3) and the radial width of the box stab flank (4) being sufficiently close in dimension to each other, and the radial width of the pin load flank (5) and the radial width of the box load flank (6) being sufficiently close in dimension to each other, such that when the mating flanks wedge and seal against one another at the position of full make-up, there exists no gap between roots and crests greater than the bridge thickness dimension (22).

* * * * *